(12) United States Patent
Uesugi

(10) Patent No.: US 7,921,149 B2
(45) Date of Patent: Apr. 5, 2011

(54) DIVISION AND SQUARE ROOT ARITHMETIC UNIT

(75) Inventor: Takahiko Uesugi, Yamanashi (JP)

(73) Assignee: NEC Corporation, Tokyo (JP)

( * ) Notice: Subject to any disclaimer, the term of this patent is extended or adjusted under 35 U.S.C. 154(b) by 1170 days.

(21) Appl. No.: 11/299,697

(22) Filed: Dec. 13, 2005

(65) Prior Publication Data

US 2006/0129623 A1    Jun. 15, 2006

(30) Foreign Application Priority Data

Dec. 15, 2004   (JP) ................................. 2004-362300

(51) Int. Cl.
*G06F 7/38*   (2006.01)
*G06F 7/552*  (2006.01)
*G06F 7/44*   (2006.01)
*G06F 7/52*   (2006.01)

(52) U.S. Cl. ........ 708/605; 708/500; 708/504; 708/650; 708/490

(58) Field of Classification Search ................. 708/499, 708/605, 650–656; 364/750–767
See application file for complete search history.

(56) References Cited

U.S. PATENT DOCUMENTS

| | | | | |
|---|---|---|---|---|
| 4,939,686 A * | 7/1990 | Fandrianto | ..................... | 708/605 |
| 5,023,827 A * | 6/1991 | Kehl et al. | ..................... | 708/542 |
| 5,128,891 A   | 7/1992 | Lynch et al. | | |
| 5,386,376 A * | 1/1995 | Girard et al. | .................. | 708/656 |
| 5,687,106 A * | 11/1997 | Schwarz et al. | .............. | 708/499 |
| 5,787,030 A * | 7/1998 | Prabhu et al. | ................. | 708/650 |
| 6,108,682 A * | 8/2000 | Matheny | ....................... | 708/656 |
| 6,490,607 B1 * | 12/2002 | Oberman | ..................... | 708/620 |
| 7,016,930 B2 * | 3/2006 | Hinds et al. | ................... | 708/650 |
| 7,243,119 B1 * | 7/2007 | Yamada et al. | ............... | 708/650 |

FOREIGN PATENT DOCUMENTS

| | | |
|---|---|---|
| JP | 04-227535 | 8/1992 |
| JP | 9-160758 | 6/1997 |
| JP | 10-187420 | 7/1998 |
| JP | 11-353158 | 12/1999 |
| JP | 2001-92639 | 4/2001 |
| JP | 2001-222410 | 8/2001 |

(Continued)

OTHER PUBLICATIONS

"167 MHz Radix-8 Divide and Square Root Using Overlapped Radix-2 Stages", J. Arjun Prabhu and Gregory B. Zyner, 1995.*

(Continued)

*Primary Examiner* — Lewis A Bullock, Jr.
*Assistant Examiner* — Kevin Hughes
(74) *Attorney, Agent, or Firm* — Young & Thompson

(57) ABSTRACT

A division and square root arithmetic unit carries out a division operation of a higher radix and a square root extraction operation of a lower radix. A certain bit number (determined on the basis of a radix of an operation) of data selected from upper bits of the output of a carry save adder and the output of the adder are input to convert the data into twos complement representation data, and the twos complement representation data is shifted a certain bit number (determined on the basis of the radix of the operation) to use the shifted data for a partial remainder of the next digit. Hence, a large number of parts such as registers of a divisor and a partially extracted square root can be commonly used in a divider and a square root extractor to realize an effective and high performance arithmetic unit.

2 Claims, 3 Drawing Sheets

FOREIGN PATENT DOCUMENTS

WO            WO0229546     *    4/2002

OTHER PUBLICATIONS

George S. Taylor, "Compatable Hardware for Division and Square Root", 1981, University of California, p. 127-133.*

Inui et al., A 250MHz CMOS Floating-Point Divider with Operand Pre-Scaling, 1999, pp. 17-18.*

"167 MHz Radix-8 Divide and Square Root Using Overlapped Radix-2 Stages," J. Arjun Prabhu et al., Proceedings Of The 12$^{th}$ Symposium Of Computer Arithmetic, Jul. 1995, pp. 155-162, XP-002372715.

"High-Radix Division and Square-Root With Speculation," Jordi Cortadella et al., IEEE Transactions On Computers, vol. 43, No. 8, Aug. 1994, pp. 919-931, XP002372877.

"Algorithm for High Speed Shared Radix 4 Division and Radix 4 Square-Root," Jan Fandrianto, Proceedings of The Symposium On Computer Arithmetic, May 19-21, 1987, Washington, IEEE Comp. Soc. Press, U.S. vol. Symp. 8, May 1987, pp. 73-79, XP000756189.

European Search Report.

"High Speed Arithmetic System of Computers" 1980, Kindai Kagaku Sha Co., Ltd., pp. 214-249.

Milos D. Ercegovac and Thomas Lang "On-the-Fly Conversion of Redundant Into Conventional Representations" IEEE Transactions on Computers, vol. C-36, No. 7, Jul. 1987, pp. 895-897.

Milos D. Ercegovac and Tomas Lang "Radix-4 Square Root Without Intial PLA" IEEE Transactions On Computers, vol. 39, No. 8, Aug. 1990, pp. 1016-1024.

* cited by examiner

DIVISION AND SQUARE ROOT ARITHMETIC UNIT

BACKGROUND OF THE INVENTION

The present invention relates to a division and square root arithmetic unit including a divider of a higher radix type and a square root extractor of a lower radix type.

In mounting of a divider and a square root extractor, a device using a subtraction shift method or a subtraction separation method is generally employed as algorithm in consideration of the balance between a hardware amount and performance. This algorithm carries out a division by shifting a remainder or partial remainder and subtracting a multiple of a denominator (a divisor or a partially extracted square root) from the remainder to determine a quotient in a similar manner to a manual division calculation on paper. More specifically, a quotient or a number extracted from a square root is determined every n digits to calculate a partial remainder on the basis of the determined quotient or the extracted number from the square root. In the next operation step, the obtained partial remainder is shifted n digits to determine the next n-digit quotient or the square root extraction number on the basis of the n-digit shift of the partial remainder. Similarly, the operation is repeatedly performed.

This method for determining the quotient or square root extraction value every n digits is called, when the n-th power of 2 is defined to be equal to r (hereinafter referred to as radix), a division or square root extraction of radix r. A division and square root extraction processing of such algorithms has been described in Nonpatent Document 1 by Kai Hwang, "High Speed Arithmetic System of Computers", 1980, Kindai Kagaku Sha Co., Ltd., pp. 214-249. This document has disclosed various division methods such as a restoring division, a nonrestoring division, an SRT (Sweeney, Robertson and Tocher) division and a generalized SRT division.

A procedure of a division using the subtraction shift method will be described briefly.

It is assumed that a bit length (a number of unit digits for determining a quotient or square root extraction number) of an operation is n (=arbitrary positive integer), a radix of the operation is r (=the n-th power of 2), a divisor is D, a dividend is R(0), a partial remainder at iteration j (j=a positive integer including 0) is R(j), and a quotient at iteration j is q(j). Furthermore, in this case, it is supposed that the divisor D and the dividend R(0) are normalized. In this instance, it is also assumed that as a normalized floating point format, "1. xxxx" is used, and both the divisor and the dividend are normalized. When a data form against this format is handled, a processing using this normalized floating point format can be applied by conducting a proper shift processing of data before and after an operation.

In this case, the quotient and the partial remainder are represented by redundant binary representations. That is, while each bit is expressed as $\{0\ 1\}$ in twos complement representation, each bit is allowed to take three values $\{-1, 0, 1\}$ and can be a negative value.

Under conditions that input data is normalized as described above, the quotient and the partial remainder can be consecutively determined by using the following recurrence equation (1).

$$R(j+1) = r \cdot R(j) - q(j+1) \cdot D \tag{1}$$

In the SRT method, $\{-1\}$ can be used as quotient digits besides $\{0, 1\}$ and the quotient digits can be quickly determined by using several upper bits of the partial remainder. The SRT algorithm can be used for a square root extraction operation and hence division hardware can be utilized.

A procedure of a square root extraction operation will be descried briefly.

It is supposed that a radix of an operation is r, an extracted square root is R(0), a partial remainder at iteration j (j=a positive integer including 0) is R(j), a partially extracted square root is Q(j), and that a quotient at iteration j is q(j). It is also assumed that the extracted square root R(0) is normalized. The partially extracted square root Q(j) is the quotient calculated up to the j-th step.

In this instance, the used quotients (including the partially extracted square roots) and the partial remainders are represented by the redundant binary representation. That is, although each bit can be expressed as $\{0\ 1\}$ in the twos complement representation, each bit is allowed to take three values $\{-1, 0, 1\}$ and can be a negative value.

Under conditions that input data is normalized as described above, a quotient and a partial remainder can be successively obtained by using the following recurrence equations (2) and (3).

$$R(j+1) = r \cdot R(j) - q(j+1) \cdot (r \cdot Q(j) + q(j+1) \cdot r^{-(j+1)}) \tag{2}$$

$$Q(j+1) = Q(j) + q(j+1) \cdot r^{-(j+1)} \tag{3}$$

In the square root extraction operation, the algorithm is that a partial remainder at iteration j+1 is calculated by subtracting a partially extracted square root from a partial remainder at iteration j. The above operation is very complicated because the operation requires the partial remainder in the redundant binary representation and the partially extracted square root in the redundant binary representation. When, after all the partially extracted square roots in the redundant binary representation are obtained, the partially extracted square roots are converted into the twos complement representation, the time required for the conversion is added to the calculation time. This deteriorates processing performance.

Hence, in order to commonly use the hardware for the division, by using a circuit for an on-the-fly conversion, the partially extracted square root obtained simultaneously with the quotient is converted into the twos complement representation to carry out the operation with the partial remainder in the redundant binary representation and the partially extracted square root in the twos complement representation.

An on-the-fly conversion is disclosed in Nonpatent Document 2 by Milos D. Ercegovac and Tomas Lang, "On-the-fly Conversion of Redundant into Conventional Representations", IEEE Transactions On Computers, Vol. C-36, No. 7, July 1987, pp. 895-897.

An on-the-fly conversion in the case of radix 2 will be described briefly.

For instance, a conversion of a redundant binary representation $\{1, -1\}$ into the twos complement representation results in $\{1, 0\}$ (both represent decimal number 1). If the redundant binary representation is converted into the twos complement representation using addition and subtraction, carry propagates when $-1$ is input. To present the carry propagation, in this case $\{0, 1\}$ is previously prepared in addition to $\{1, 0\}$ which is a value before $-1$ is input and $\{0, 1\}$ is selected when $-1$ is input. That is, in order to execute the processing in a fixed time without causing the carry propagation, when a response (in other words, a representation smaller by 1) in the case where $-1$ is input is previously prepared, the carry propagation can be prevented.

Now, assuming that j decimal places of a quotient Q determined successively from the upper digit in the redundant binary representation and a quotient Z in the twos complement representation are $Q(j)$ $(=q(1)q(2) \ldots q(j))$ and $Z(j)$ $(=z(1)z(2) \ldots z(j))$ respectively, $Z(j)$ can be represented from the above-description in a twos complement form of either $Q(j)$ or $Q(j)-2^{-j}$. Accordingly, when $Q(j)$ and $Q(j)-2^{-j}$ in the twos complement form are held at each operation step, $Z(j)$ can be immediately determined once $q(j)$ is determined.

It is supposed that quotient digits at iteration $j+1$ during an operation is $q(j+1)$, and that the twos complement forms of $Q(j)$ and $Q(j)-2^{-j}$ are denoted as $QP(j)$ and $QN(j)$ respectively, which are referred to as a partial square root positive and a partial square root negative respectively. When the operation is executed according to the radix to determine $q(j+1)$, from $QP(j)$ and $QN(j)$, $QP(j+1)$ and $QN(j+1)$ can be determined as follows:

When $q(j+1) = -1$, (4)
$QP(j+1) = QP(j) - 2^{-(j+1)} = QN(j) + 2^{-j} - 2^{-(j+1)} = QN(j) + 2^{-(j+1)}$.

$QN(j+1)\{ = QP(j+1) - 2^{-(j+1)}\} =$ (5)
$\quad QP(j) - 2^{-(j+1)} - 2^{-(j+1)} = QP(j) - 2^{-j} = QN(j)$ When $q(j+1) = 0$ (6)
$QP(j+1) = QP(j)$ $QN(j+1) = QN(j) + 2^{-(j+1)}$ (7)

When $q(j+1) = 1$, $QP(j+1) = QP(j) + 2^{-(j+1)}$ (8)

$QN(j+1)\{ = QP(j+1) - 2^{-(j+1)}\} = QP(j) + 2^{-(j+1)} - 2^{-(j+1)} = QP(j)$. (9)

Equations (4), (7) and (8) can be expressed by the following equation:

$$Q_x(j+1) = Q_y(j) + 2^{-(j+1)}$$

assuming that a radix of the operation is 2.

It is sufficient for this operation to just connect a bit string of $q(j+1)$ which is a quotient (0 or 1) of the $(j+1)$-th digit to the back of a partially extracted square root $Q_y(j)$ of up to the $j$-th digit. Therefore, no substantial operation is executed. It is sufficient for the other equations only to select either $QP(j)$ or $QN(j)$. That is because the partially extracted square root $Q(j+1)$ at iteration $j+1$, namely $QP(j+1)$, can be converted from a redundant binary form to a twos complement form (a normal number) through a simple bit operation where $QP(j)$ as the partial square root positive at iteration $j$ and $QN(j)$ as the partial square root negative at iteration $j$ are computed and stored.

Further, a division operation method according to the SRT method is disclosed in Japanese Patent Application Laid-Open No. 2001-222410, "Divider"(Patent Document 1). In this case, by scaling a divisor within a certain range such as 5/3≦divisor<1.75, upper 4 bits of a partial remainder is normalized and the normalized upper 4 bits are referred to, resulting in a determination of a quotient of 2 bits (a dividing circuit of a radix 4).

Since producing of a partial remainder in a division operation can be realized by a subtraction in consideration of a divisor D of a fixed value, a higher radix can be realized by scaling a range of a divisor. However, in producing a partial remainder in a square root extraction operation, a subtraction is carried out necessarily considering a partially extracted square root $Q(j)$ at iteration $j$ and a quotient $q(j)$. In order to realize a higher radix, it is necessary to consider another quotient of a digit just ahead of the quotient generation unit. Hence, circuitry becomes complicated and the processing requires much time. A processing of a square root extraction operation of a higher radix is disclosed in Non-patent Document 3 by Milos D. Ercegovac and Tomas Lang, "Radix-4 Square root Without Initial PLA", IEEE Transactions On Computers, Vol. 39, No. 8, August 1990, pp. 1016-1024. In this instance, a quotient of 2 bits can be determined on the basis of a partially extracted square root of 3 bits and the upper 7 bits of a partial remainder. However, when such a square root extraction operation for a higher radix is adopted, circuitry for determining a quotient is enlarged and complicated and a logic stage number is increased and complicated.

Further, a common use of a divider and a square root extractor has been proposed in Japanese Patent Application Laid-Open No. Hei 10-187420, "Divider and Square root Extractor"(Patent Document 2). This discloses a divider and a square root extractor according to a lower radix 2 and hence cannot execute a division of a higher radix and a square root extraction operation of a lower radix.

As described above, a square root extraction operation of a higher radix needs a complicated circuit having a larger number of logic stages than a division operation of a higher radix. When the same radix is adopted in a division operation and a square root extraction, processing performance depends on the number of logic stages in the square root extraction and processing performance of a division can deteriorate. In order to prevent the deterioration of the division processing performance, the radix of the square root extraction operation should be lower than that of the division operation. For example, to realize a circuit system for referring to upper 4 bits of a partial remainder in a square root extraction operation, radix 2 is preferred.

SUMMARY OF THE INVENTION

It is therefore an object of the present invention to provide a division and square root arithmetic unit in view of the aforementioned problems of the prior art, which shares large parts effectively between a division and a square root extraction and adopting a higher radix of the division operation than that of the square root extraction operation without lowering processing performance of the division operation.

In accordance with one aspect of the present invention, there is provided a division and square root arithmetic unit for carrying out a division operation of a higher radix and a square root extraction operation of a lower radix, comprising: a quotient producer for producing a quotient by referring to upper bits of a partial remainder; a partial remainder register for holding the upper bits of the partial remainder in a twos complement representation and lower bits of the partial remainder in a redundant binary representation except the upper bits of the partial remainder; a divisor-partial square root register for holding one of a divisor and a partially extracted square root depending on a kind of operations; a divisor-partial square root selector for selecting one of the divisor and the partially extracted square root from the divisor-partial square root register on the basis of the quotient; a carry save adder for inputting the lower bits of the partial remainder in the redundant binary representation and an output of the divisor-partial square root selector to add input data; a carry propagation adder for inputting the upper bits of the partial remainder in the twos complement representation, the lower bits of the partial remainder in the redundant binary representation, the output of the divisor-partial square root selector and a carry signal from the carry save adder to add input data; and a twos complement conversion and shift device for inputting a certain bit number, which is determined on the basis of a radix, of bit data from upper bits of an output of the carry save adder and an output of the carry propagation adder, converting input data into twos complement representation data, and shifting the twos complement representation data by a certain bit number, which is determined on the basis of a radix of an operation, to obtain another partial remainder at a next step.

In a division and square root arithmetic unit, the twos complement conversion and shift device can comprise: a first twos complement converter for inputting the certain bit number, which is determined on the basis of the higher radix, of the bit data from the upper bits of the output of the carry save adder and the output of the carry propagation adder, and converting the input data into the twos complement representation data; a second twos complement converter for inputting the certain bit number, which is determined on the basis of the lower radix, of the bit data from the upper bits of the output of the carry save adder and the output of the carry propagation adder, and converting the input data into the twos complement representation data; a selector for selecting either the first twos complement converter in the division operation or the second twos complement converter in the square root extraction operation; and a shifter for shifting an output of the selector a first bit number determined on the basis of the higher radix in the division operation and a second bit number determined on the basis of the lower radix in the square root extraction operation to obtain another partial remainder at the next step.

In another division and square root arithmetic unit, the twos complement conversion and shift device can comprise: a first shifter for shifting to the right the upper bits of the partial remainder in the twos complement representation by a certain bit quantity determined by a difference between radices of the division operation and the square root extraction operation to send shifted data to the carry save adder; a second shifter for shifting to the right the lower bits of the partial remainder in the redundant binary representation by a certain bit quantity determined by the difference between the radices of the division operation and the square root extraction operation to send shifted data to the carry propagation adder; a twos complement converter for inputting the result of the carry propagation adder and data extracted in a bit quantity of the higher radix of the division operation from the upper bits of the result of the carry save adder, and converting the input data into the twos complement representation data; and a third shifter for shifting an output of the twos complement converter by a certain bit number determined on the basis of the higher radix to obtain another partial remainder at the next step.

According to the present invention, a certain bit number (determined on the basis of a radix of an operation) of data selected from upper bits of the output of a carry save adder and the output of the adder are input to convert the data into twos complement representation data, and the twos complement representation data is shifted by a certain bit number (determined on the basis of the radix of the operation) to use the shifted data for a partial remainder of the next digit. Hence, a large number of parts such as registers for a divisor and a partially extracted square root can be commonly used in a divider and a square root extractor to realize an effective and high performance arithmetic unit. Furthermore, a radix of a division operation can be set higher than that of a square root extraction operation, and division processing performance can be largely improved.

In a square root extraction operation, a shifter shifts partial remainder upper bits which are held in the twos complement representation in the partial remainder upper register, by 1 bit to the right, and a shifter shifts partial remainder lower bits which are held in the redundant binary representation in the partial remainder lower register, by 1 bit to the right. A twos complement converter selects 2 bits data from the upper bits of the output of the carry save adder and converts the selected data into twos complement representation data. In the division operation and the square root extraction operation, the result obtained by subtracting the divisor-partial square root selection data from the partial remainder at iteration j is shifted by 2 bits to the left to obtain partial remainder data at iteration j+1. Hence, the circuit delay time of the path for returning the result obtained by subtracting the divisor from the partial remainder to the partial remainder upper register can be improved, and the processing speed can be improved in the division operation and the square root extraction operation.

Furthermore, according to the present invention, in the square root extraction operation, the partial remainder previously shifted by 1 bit to the right is prepared, and another partial remainder is operated from the 1 bit shifted partial remainder to set the shift bit number to the same as 2 bits shift to the left for the division operation. Hence, the twos complement converter can be commonly used in the division operation and the square root extraction operation without adding the selector in the return path of the data. Therefore, the lowering of the processing speed in the division operation and the square root extraction operation can be prevented in the division and square root arithmetic unit of the present invention.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENT(S)

The present invention will now be described in detail with reference to its preferred embodiments in connection with the attached drawings.

In the following preferred embodiments, it is assumed that radix 4 of a division operation, a digit set $\{-3, -2, -1, 0, 1, 2, 3\}$, a divisor having n bits of a decimal number, and a dividend having n bits of a decimal number are used, and a generalized SRT division algorithm as an operational algorithm is adopted. It is also supposed that radix 2 of a square root extraction operation, a digit set $\{-1, 0, 1\}$, and an extracted square root having n bits of a decimal number are used, and an SRT square root algorithm as an operational algorithm is adopted.

Figure 1:
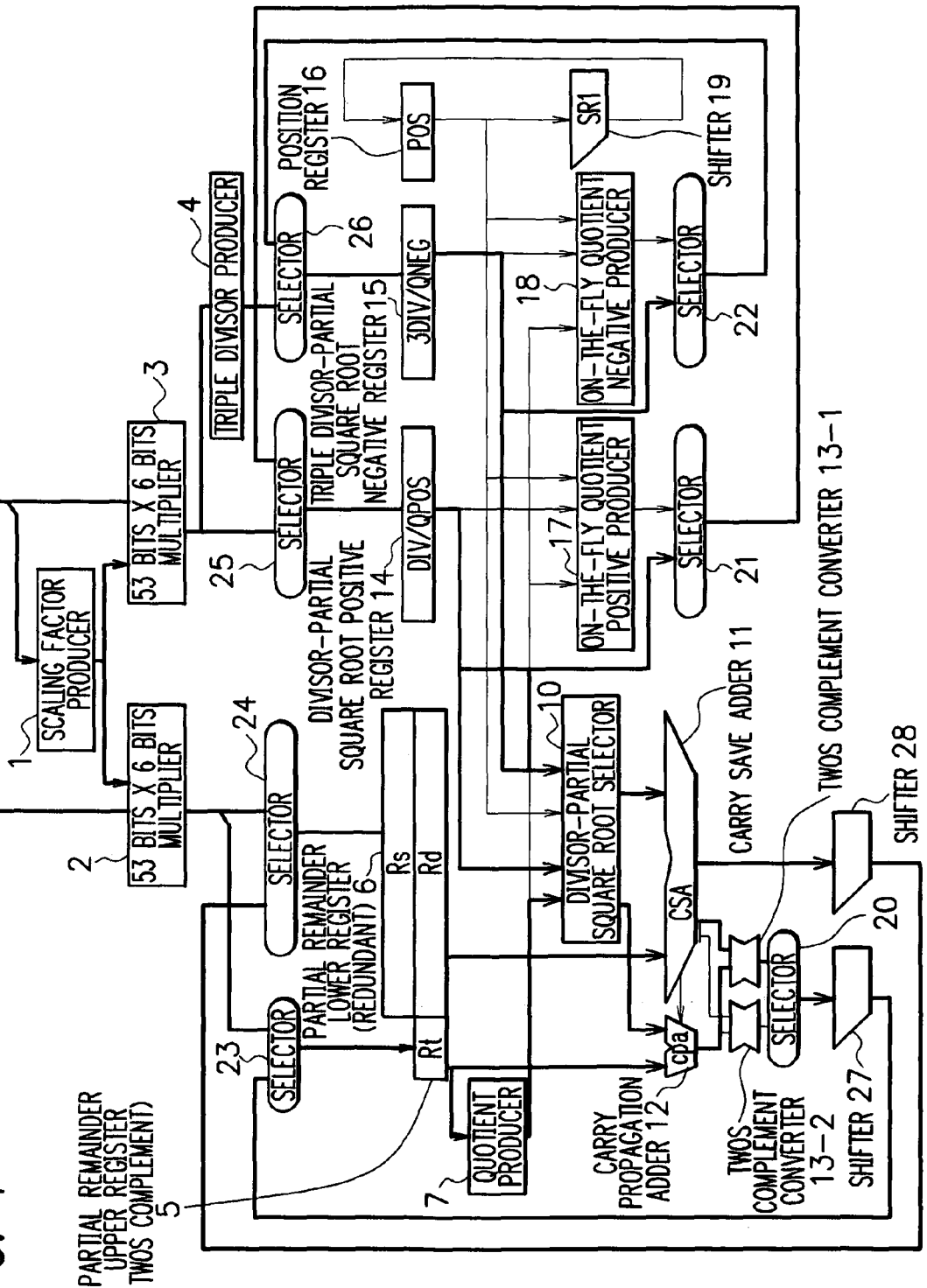
FIG. 1 is a block diagram of a division and square root arithmetic unit according to a first embodiment of the present invention for explaining a division operation.

In FIG. 1, there is shown a division and square root arithmetic unit according to a first embodiment of the present invention.

In FIG. 1, a scaling factor producer 1 produces a multiplication factor to be used for scaling. The scaling factor producer 1 produces from the divisor a multiplication factor for scaling a divisor within a range such as $5/3 \leqq \text{divisor} < 1.75$ in a division operation but in a square root extraction operation carries out a processing using a multiplication factor=1. A pair of 53 bits×6 bits multipliers 2 and 3 multiply an input dividend of 53 bits and an input divisor of 53 bits by the multiplication factor fed from the scaling factor producer 1, respectively, to output the multiplication results. This implements normalization of upper 4 bits of a partial remainder and refers to the upper 4 bits to determine a quotient of 2 bits (a divider of radix 4).

In a division operation of radix 4, the divisor is scaled within the range such as $5/3 \leq divisor < 1.75$ to produce the quotient of 2 bits from the upper 4 bits of the partial remainder. When the method for producing the quotient only from the upper 4 bits of the partial remainder is adopted, deterioration of division processing performance can be prevented even in a square root extraction operation.

A triple divisor producer 4 triplicates the output of the 53 bits×6 bits multiplier 2 to produce and output the triple divisor.

A partial remainder upper register 5 holds the upper 4 bits of the partial remainder in a twos complement representation. A partial remainder lower register 6 holds lower bits of the partial remainder in a redundant binary representation except the upper 4 bits held by the partial remainder upper register 5.

A quotient producer 7 selects one of the upper 4 bits of the partial remainder held in the partial remainder upper register 5 in the twos complement representation. That is, one of a digit set $\{-3, -2, -1, 0, 1, 2, 3\}$ in a division operation or one of a digit set $\{-1, 0, 1\}$ in the square root extraction operation is selected to produce a quotient.

A divisor-partial square root selector 10 selects a divisor on the basis of the quotient produced in the quotient producer 7 in the division operation or the partially extracted square root on the basis of the quotient produced in the quotient producer 7 and position data stored in a position register 16 in the square root extraction operation.

A carry save adder 11 receives the lower bits of the partial remainder in the redundant binary representation from the partial remainder lower register 6 and the output of the divisor-partial square root selector 10 and adds the two data without any carry propagation to output a carry signal to a carry propagation adder 12.

The carry propagation adder 12 adds the upper 4 bits of the partial remainder sent from the partial remainder upper register 5, the output of the divisor-partial square root selector 10 and the carry signal fed from the carry save adder 11.

In a shift operation of partial remainder data obtained by subtracting the divisor-partial square root selection data from the partial remainder, a radix must be considered. In the case of a square root extraction operation of radix 2, data obtained by subtracting the divisor-partial square root selection data from a partial remainder at iteration j is shifted 1 bit to the left to obtain partial remainder data at iteration j+1. On the other hand, in the case of a division operation of a radix 4, the data obtained by subtracting the divisor-partial square root selection data from the partial remainder at iteration j is shifted 2 bits to the left to obtain another partial remainder data at iteration j+1. In addition, since the quotient production can be quickened by holding the data referred to in the quotient production in the twos complement representation in the partial remainder upper register 5, the aforementioned shift process is executed by using a pair of twos complement converters 13-1 and 13-2 for converting a shift bit number of data of the lower bits in the redundant binary representation into twos complement representation data.

The twos complement converter 13-1 selects a certain bit number (2 bits in this case) of data from the upper bits of the output of the carry save adder 11 on the basis of the radix of the division operation and converts the selected data into the twos complement representation data. The twos complement converter 13-2 selects a certain bit number (1 bit in this case) of data from the upper bits of the output of the carry save adder 11 on the basis of the radix of the square root extraction operation and converts the selected data into the twos complement representation data. A selector 20 receives the outputs of the twos complement converters 13-1 and 13-2 and selects the output of the twos complement converter 13-1 in the division operation or the output of the twos complement converter 13-2 in the square root extraction operation. A shifter 27 shifts the output of the selector 20 by 2 bits in the division operation or 1 bit in the square root extraction operation to send the shifted data to a selector 23. A shifter 28 shifts the lower bits of the output of the carry save adder 11, except its upper bits sent to the twos complement converter 13-1, by 2 bits in the division operation or 1 bit in the square root extraction operation to send the shifted data to a selector 24.

A divisor-partial square root positive register 14 holds the divisor in the division operation or the partially extracted square root in the square root extraction operation. A triple divisor-partial square root negative register 15 holds the triple divisor in the division operation or the partially extracted square root in the square root extraction operation.

The position register 16 holds processing bit information for connecting the partially extracted square root and quotient digits produced in the quotient producer 7 in the square root extraction operation.

An on-the-fly quotient positive producer 17, like the prior art, in parallel with producing a quotient, executes a conversion from redundant binary representation data into twos complement representation data and hence produces partial square root positive data in the twos complement representation like the prior art. An on-the-fly quotient negative producer 18, like the prior art, in parallel with producing a quotient, executes a conversion from redundant binary representation data into twos complement representation data and hence produces partial square root negative data such as −1 in the twos complement representation like the prior art.

A shifter 19 shifts the position data of the position register 16 by 1 bit to the right every cycle.

A selector 21 selects the output of the on-the-fly quotient positive producer 17 in the square root extraction operation or the output of the divisor-partial square root positive register 14 in the division operation. A selector 22 selects the output of the on-the-fly quotient negative producer 18 in the square root extraction operation or the output of the triple divisor-partial square root negative register 15 in the division operation.

A selector 23 selects the output of the multiplier 2 in the first cycle, and the output of the twos complement converter 13-1 or 13-2 via the shifter 27 in the second cycle and thereafter. A selector 24 selects the output of the multiplier 2 in the first cycle, and the output of the carry save adder 11 via the shifter 28 in the second cycle and thereafter.

A selector 25 selects the output of the multiplier 3 in the first cycle, and the output of the selector 21 in the second cycle and thereafter. A selector 26 selects the output of the triple divisor producer 4 in the first cycle, and the output of the selector 22 in the second cycle and thereafter.

An operation of a division in the division and square root arithmetic unit of the first embodiment of the present invention will be described in detail in connection with FIG. 1.

First, the scaling factor producer 1 produces a multiplication factor for scaling a divisor within a range such as $5/3 \leq divisor < 1.75$ from the upper bits of the divisor.

The produced multiplication factor is fed to the 53 bits×6 bits multipliers 2 and 3 to scale the divisor and the dividend using the multiplication factor. The triple divisor producer 4 produces the triple divisor from the scaled divisor.

In the first cycle, the selectors 23, 24, 25 and 26 select the multipliers 2 and 3 and the triple divisor producer 4 to pass the data to the partial remainder upper and lower registers 5 and 6, the divisor-partial square root positive register 14 and the triple divisor-partial square root negative register 15.

Since {−1} is not produced in the partial remainder lower register 6 to which the multiplier 2 sets the lower bits of the partial remainder in the redundant binary representation, the multiplier 2 sets {0, 1} to the partial remainder lower register 6.

The quotient producer 7 produces a quotient of 2 bits from the contents held in the partial remainder upper register 5 in which the upper bits of the partial remainder are set in the twos complement representation.

In order to select the divisor on the basis of the produced quotient, the divisor-partial square root selector 10 selects one of {−3 times, −2 times, −1 time, 0, 1 time, 2 times, 3 times}-of-scaled-divisor data.

The carry save adder 11 inputs the lower bits of the selected divisor and the lower bits of the partial remainder held in the redundant binary representation in the partial remainder lower register 6 and adds the data without any carry propagation.

When a carry is generated from the carry save adder 11, the carry save adder 11 sends a carry signal to the carry propagation adder 12.

The carry propagation adder 12 receives the upper bits of the partial remainder from the partial remainder upper register 5, the upper bits of the selected divisor from the divisor-partial square root selector 10 and the carry signal from the carry save adder 11 and adds the input data.

A partial remainder to be used in the next cycle is produced by shifting the data by 2 bits to the left according to the radix, as described above. Since a certain bit number of the data required for a quotient production of the partial remainder is held in the twos complement representation in the partial remainder upper register 5, the twos complement converter 13-1 selects 2 bits data from the lower bits of the partial remainder in the twos complement representation held in the carry save adder 11 and converts the selected 2 bits data into the twos complement representation data to send the obtained data to the shifter 27 via the selector 20. The shifter 27 shifts the received data 2 bits to the left and sends the shifted data to the partial remainder upper register 5 via the selector 23 for producing a quotient of the next digit.

In addition, similarly, the shifter 28 shifts the lower bits of the output of the carry save adder 11, except its upper bits sent to the twos complement converter 13-1, by 2 bits in the division operation or 1 bit in the square root extraction operation to send the shifted data to the partial remainder lower register 6 via the selector 24 for setting the shifted data to the partial remainder lower register 6.

In the division operation, since the divisor and the triple divisor are fixed values, the data held in the divisor-partial square root positive register 14 is selected by the selector 21 and further the selector 25 selects the selector 21 to hold the divisor data. Similarly, the triple divisor data held in the triple divisor-partial square root negative register 15 is selected by the selector 22 and further the selector 26 selects the selector 22 to hold the necessary data.

Figure 2:
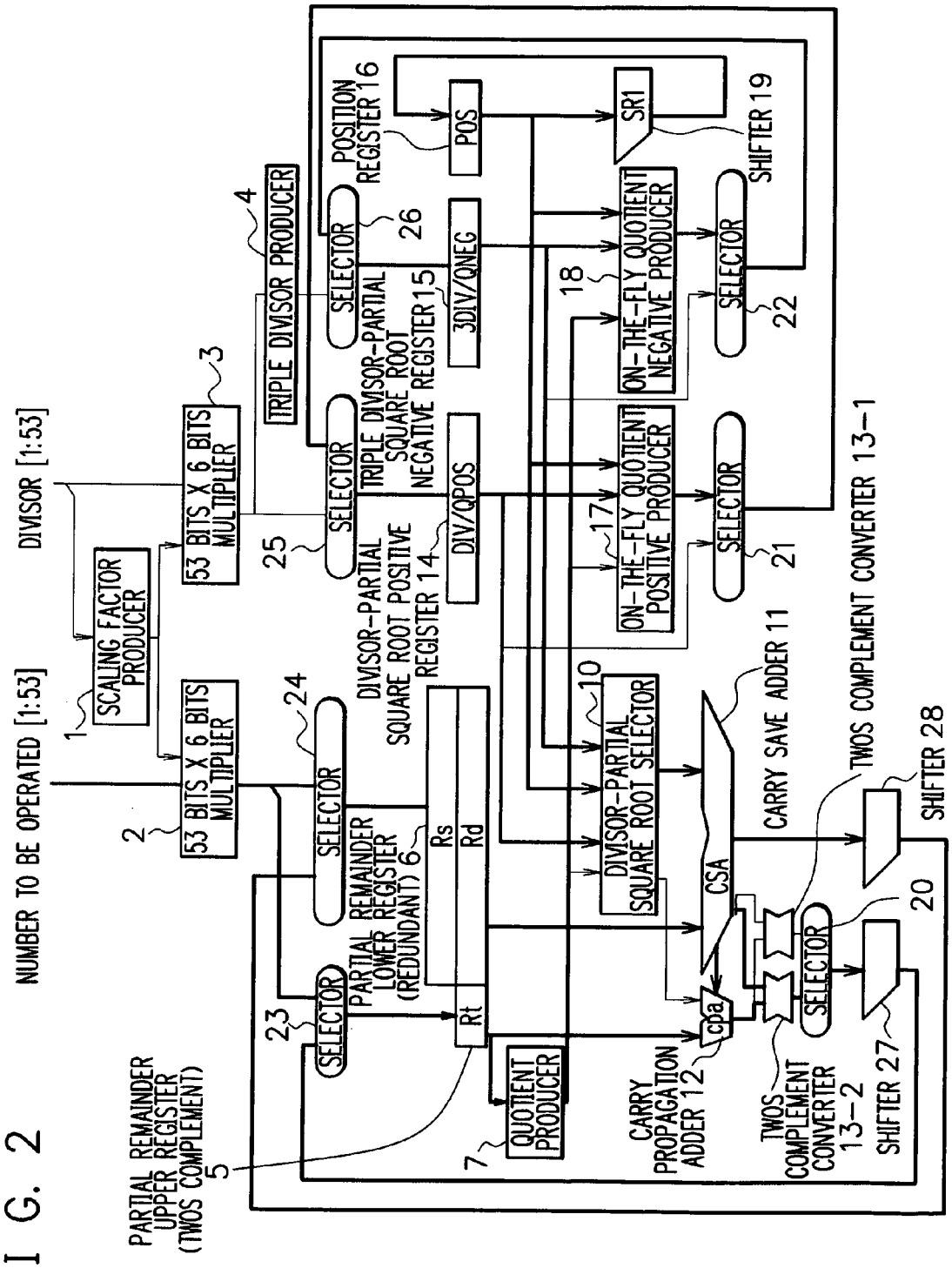
FIG. 2 is a block diagram of a division and square root arithmetic unit shown in FIG. 1 for explaining a square root extraction operation.

Next, an operation of a square root extraction in the division and square root arithmetic unit of the first embodiment of the present invention will be described in detail in connection with FIG. 2.

In a square root extraction operation, a partial remainder is calculated by using a partially extracted square root instead of a divisor. A number to be operated is set to the partial remainder upper and lower registers 5 and 6 via the multiplier 2 and the selectors 23 and 24.

The quotient producer 7 produces a quotient of 1 bit from the data held in the twos complement representation in the partial remainder upper register 5.

Since at iteration 1 a partially extracted square root R(0)=0, 0 is set in the divisor-partial square root positive register 14 and the triple divisor-partial square root negative register 15.

The divisor-partial square root selector 10 selects a partially extracted square root on the basis of the quotient produced in the quotient producer 7.

The carry save adder 11 receives the lower data of the selected partially extracted square root and the lower data of the partial remainder from the partial remainder lower register 6 and adds the input data without any carry propagation.

When a carry is generated from the carry save adder 11, the carry save adder 11 sends a carry signal to the carry propagation adder 12.

The carry propagation adder 12 receives the upper data of the partial remainder from the partial remainder upper register 5, the selected partially extracted square root from the divisor-partial square root selector 10 and the carry signal from the carry save adder 11 and adds the input data.

A partial remainder to be used in the next cycle is produced by shifting the data by 1 bit to the left according to the radix, as described above. The twos complement converter 13-2 selects 1 bit data from the lower bits of the partial remainder in the twos complement representation held in the carry save adder 11 and converts the selected 1 bit data into the twos complement representation data to send the obtained data to the shifter 27 via the selector 20. The shifter 27 shifts the received data by 1 bit to the left and sends the shifted data to the partial remainder upper register 5 via the selector 23 for producing a quotient of the next digit.

Similarly, the shifter 28 shifts the lower bits of the output of the carry save adder 11, except its upper bits sent to the twos complement converter 13-1, by 2 bits in the division operation or 1 bit in the square root extraction operation to send the shifted data to the partial remainder lower register 6 via the selector 24 for setting the shifted data to the partial remainder lower register 6.

Since the partially extracted square root connected with the quotient input to the divisor-partial square root selector 10 is input as the data not in the redundant binary representation but in the twos complement representation, while the quotient produced in the quotient producer 7 is considered, the on-the-fly quotient positive and negative producers 17 and 18 produce the partial square root positive and negative data respectively similar to the prior art.

The on-the-fly quotient positive producer 17 produces the partially extracted square root in the twos complement representation to send the produced partially extracted square root to the divisor-partial square root positive register 14 via the selectors 21 and 25 for holding the produced partially extracted square root in the divisor-partial square root positive register 14.

The on-the-fly quotient negative producer 18 produces the partially extracted square root −1 in the twos complement representation to send the produced partially extracted square root −1 to the triple divisor-partial square root negative register 15 via the selectors 22 and 26 for holding the produced partially extracted square root in the triple divisor-partial square root negative register 15 for a quotient production of the next digit.

In the position register 16 for instructing a quotient production digit, only MSB=1 is set in the initial condition. The shifter 19 shifts the position data of the position register 16 by 1 bit to the right every cycle and the 1 bit right shift data is set to the position register 16 every cycle.

As described above, in the first embodiment of the division and square root arithmetic unit according to the present invention, a certain bit number (determined on the basis of a radix of an operation) of data selected from upper bits of the output of a carry save adder and the output of the adder are input to convert the data into twos complement representation data, and the twos complement representation data is shifted by a certain bit number (determined on the basis of the radix of the operation) to use the shifted data for a partial remainder of the next digit. Hence, a large number of parts such as registers for a divisor and a partially extracted square root can be commonly used in a divider and a square root extractor to realize an effective and high performance arithmetic unit. Furthermore, a radix of a division operation can be set higher than that of a square root extraction operation, and division processing performance can be largely improved.

Figure 3:
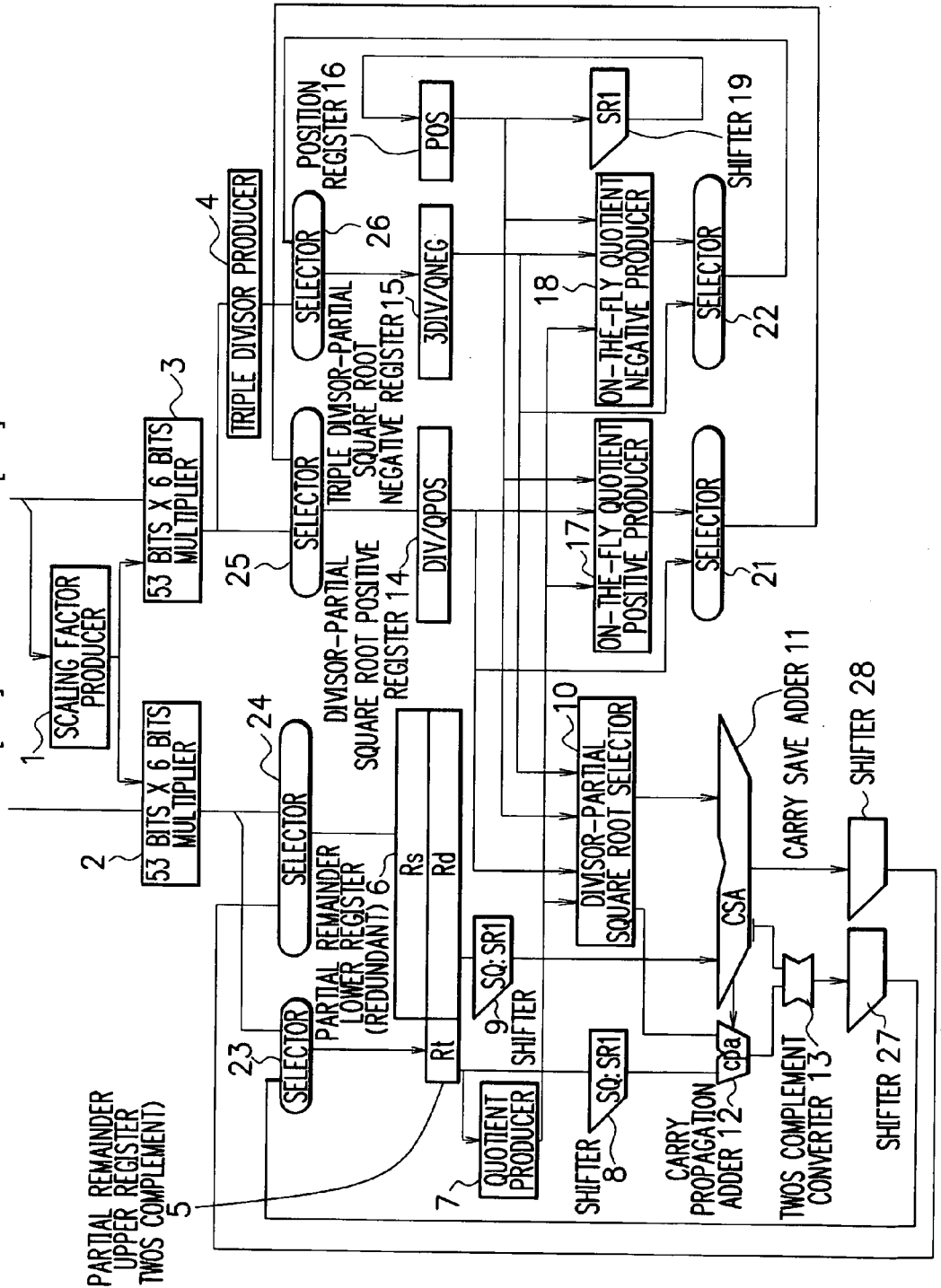
FIG. 3 is a block diagram of a division and square toot arithmetic unit according to a second embodiment of the present invention.

In FIG. 3, there is shown a division and square root arithmetic unit according to a second embodiment of the present invention.

In the first embodiment described above, to produce the partial remainder at the next step, the 2 bits data conversion into the twos complement representation in the division operation or the 1 bit data conversion into the twos complement representation in the square root extraction operation is carried out, and in addition, the selector 20 for selecting the division operation or the square root extraction operation is used. The path for returning the result obtained by subtracting the divisor from the partial remainder to the partial remainder upper register 5 includes a large number of logic stages. An addition of the selector in this path increases circuit delay time, and hence delaying a clock or a register addition becomes required, resulting in lowering a processing speed of the division operation and the square root extraction operation.

In the second embodiment, different from the first embodiment, in a square root extraction operation, a shifter 8 shifts partial remainder upper bits which are held in the twos complement representation in the partial remainder upper register 5, by 1 bit to the right, and a shifter 9 shifts partial remainder lower bits which are held in the redundant binary representation in the partial remainder lower register 6, by 1 bit to the right. Instead of the twos complement converters 13-1 and 13-2 in the first embodiment, a twos complement converter 13 selects 2 bits data from the upper bits of the output of the carry save adder 11 and converts the selected data into twos complement representation data. In the division operation and the square root extraction operation, the result obtained by subtracting the divisor-partial square root selection data from the partial remainder at iteration j is shifted by 2 bits to the left to obtain partial remainder data at iteration j+1. Hence, the circuit delay time of the path for returning the result obtained by subtracting the divisor from the partial remainder to the partial remainder upper register 5 can be improved, and the processing speed can be improved in the division operation and the square root extraction operation.

An operation of a division in the division and square root arithmetic unit of the second embodiment of the present invention will be described in detail in connection with FIG. 3.

Like the first embodiment, first, the scaling factor producer 1 produces from the upper bits of the divisor a multiplication factor for scaling a divisor within a certain range. The produced multiplication factor is fed to the 53 bits×6 bits multipliers 2 and 3 to scale the divisor and the dividend using the multiplication factor. The triple divisor producer 4 produces the triple divisor from the scaled divisor.

In the first cycle, the selector 23 selects the output of the multiplier 2 to pass the data to the partial remainder upper register 5. The selector 24 selects the output of the multiplier 2 to pass the data to the partial remainder lower register 6. The selector 25 selects the output of the multiplier 3 to pass the data to the divisor-partial square root positive register 14. The selector 26 selects the produced result of the triple divisor producer 4 to pass the data to the triple divisor-partial square root negative register 15.

The upper 4 bits of the partial remainder are set in the twos complement representation to the partial remainder upper register 5. The lower bits of the partial remainder except its upper 4 bits are set as numeric values in the redundant binary representation {0, 1} to the partial remainder lower register 6.

The quotient producer 7 produces a quotient of 2 bits from the 4 bit data held in the twos complement representation in the partial remainder upper register 5.

In order to select the divisor from the produced quotient, the divisor-partial square root selector 10 selects one of {−3 times, −2 times, −1 time, 0, 1 time, 2 times, 3 times}-of-scaled-divisor data.

The carry save adder 11 inputs the lower bits of the selected divisor and the lower bits of the partial remainder held in the redundant binary representation in the partial remainder lower register 6 and adds the data without any carry propagation. When a carry is generated from the carry save adder 11, the carry save adder 11 sends a carry signal to the carry propagation adder 12.

The carry propagation adder 12 receives the upper bits of the partial remainder from the partial remainder upper register 5, the upper bits of the selected divisor from the divisor-partial square root selector 10 and the carry signal from the carry save adder 11 and adds the input data.

A partial remainder to be used in the next cycle is produced by shifting the data certain bits to the left according to the radix, as described above. Since a certain bit number of the data required for a quotient production of the partial remainder is held in the twos complement representation in the partial remainder upper register 5, a twos complement converter 13 selects the upper 2 bits data from the carry save adder 11 and converts the selected 2 bits data from the redundant binary representation into the twos complement representation to send the obtained data to the shifter 27 via the selector 20. The shifter 27 shifts the received data 2 bits to the left and sends the shifted data to the partial remainder upper register 5 via the selector 23 for producing a quotient of the next digit. In addition, similarly, the shifter 28 shifts the lower bits of the output of the carry save adder 11, except its upper bits sent to the twos complement converter 13, by 2 bits to send the shifted data to the partial remainder lower register 6 via the selector 24 for setting the shifted data to the partial remainder lower register 6.

In the division operation, since the divisor is a fixed value, the data held in the divisor-partial square root positive register 14 is selected by the selector 21 and further the selector 25 selects the selector 21 to hold the divisor data. Similarly, since the triple divisor is a fixed value, the triple divisor data held in the triple divisor-partial square root negative register 15 is selected by the selector 22 and further the selector 26 selects the selector 22 to hold the necessary data.

Next, an operation of a square root extraction in the division and square root arithmetic unit of the second embodiment of the present invention will be described in detail in connection with FIG. 3.

First, a number to be operated is set to the partial remainder upper and lower registers 5 and 6 via the multiplier 2 and the selectors 23 and 24.

The quotient producer 7 produces a quotient of 1 bit from the data held in the twos complement representation in the partial remainder upper register 5.

Since at 1 time a partially extracted square root R(0)=0, 0 is set in the divisor-partial square root positive register 14 and the triple divisor-partial square root negative register 15.

The divisor-partial square root selector 10 selects a partially extracted square root on the basis of the quotient produced in the quotient producer 7.

The shifter 8 shifts the output of the partial remainder upper register 5 holding the data in the twos complement representation, by 1 bit to the right. The shifter 9 shifts the output of the partial remainder lower register 6 holding the data in the redundant binary representation, by 1 bit to the right.

The carry save adder 11 receives the lower data of the selected partially extracted square root from the divisor-partial square root selector 10 and the shifted lower data of the partial remainder from the shifter 9 and adds the input data without any carry propagation. When a carry is generated from the carry save adder 11, the carry save adder 11 sends a carry signal to the carry propagation adder 12.

The carry propagation adder 12 receives the shifted upper data of the partial remainder from shifter 8, the selected partially extracted square root from the divisor-partial square root selector 10 and the carry signal from the carry save adder 11 and adds the input data.

A partial remainder to be used in the next cycle is produced by shifting the data by a certain bit number to the left according to the radix, as described above. Regarding the upper bits, the twos complement converter 13 selects the upper 2 bit data from the upper bits of the output of the carry save adder 11 and converts the selected 2 bit data from the redundant binary representation into the twos complement representation. The obtained data should be shifted according to the radix. Since the data of the partial remainder is already shifted by 1 bit to the right by the shifters 8 and 9 before inputting to the carry save adder 11 and the carry propagation adder 12. Therefore, the data output from the twos complement converter 13 is shifted by 2 bits to the left by the shifter 27 in the same manner as the division operation. The shifted data is sent to the partial remainder upper register 5 via the selector 23 and is set there for producing a quotient of the next digit.

As to the lower bits, the shifter 28 shifts the lower bits of the output of the carry save adder 11, except its upper bits sent to the twos complement converter 13, by 2 bits to send the shifted data to the partial remainder lower register 6 via the selector 24 for setting the shifted data to the partial remainder lower register 6.

Since the partially extracted square root connected with the quotient input to the divisor-partial square root selector 10 is input as the data not in the redundant binary representation but in the twos complement representation, while the quotient produced in the quotient producer 7 is considered, the on-the-fly quotient positive and negative producers 17 and 18 produce the partial square root positive and negative data, respectively similar to the prior art.

The on-the-fly quotient positive producer 17 produces the partially extracted square root in the twos complement representation to send the produced partially extracted square root to the divisor-partial square root positive register 14 via the selectors 21 and 25. The produced partially extracted square root is held in the divisor-partial square root positive register 14. The on-the-fly quotient negative producer 18 produces the partially extracted square root −1 in the twos complement representation to send the produced partially extracted square root −1 to the triple divisor-partial square root negative register 15 via the selectors 22 and 26. The produced partially extracted square root is held in the triple divisor-partial square root negative register 15 and is sent to the divisor-partial square root selector 10 for a quotient production of the next digit.

In the position register 16 for instructing a quotient production digit, only MSB=1 is set in the initial condition. The shifter 19 shifts the position data of the position register 16 by 1 bit to the right every cycle and the 1 bit right shifted data is set to the position register 16 every cycle.

As described above, in the second embodiment of the division and square root arithmetic unit according to the present invention, in the square root extraction operation, the partial remainder previously shifted by 1 bit to the right is prepared, and another partial remainder is operated from the 1 bit shifted partial remainder to set the shift bit number to the same as 2 bits shift to the left for the division operation. Hence, the twos complement converter can be commonly used in the division operation and the square root extraction operation without adding the selector in the return path of the data. Therefore, the lowering of the processing speed in the division operation and the square root extraction operation can be prevented in the division and square root arithmetic unit of the present invention.

Furthermore, the present invention can be employed in high speed calculation fields including a square root extraction operation used for coordinates calculation used by visualization of numerical computation results.

While the present invention has been described with reference to the particular illustrative embodiments, it is not to be restricted by those embodiments but only by the appended claims. It is to be appreciated that those skilled in the art can change and modify the embodiments without departing from the scope and spirit of the present invention.

What is claimed is:

1. A division and square root arithmetic unit for carrying out a division operation of a higher radix and a square root extraction operation of a lower radix, comprising:

a quotient producer for producing a quotient by referring to upper bits of a partial remainder; a partial remainder register for holding the upper bits of the partial remainder in a two's complement representation and lower bits of the partial remainder in a redundant binary representation except the upper bits of the partial remainder;

a divisor-partial square root positive register for holding one of a divisor in the division operation and a partially extracted positive square root in the square root extraction operation;

a triple divisor-partial square root negative register for holding one of a triple divisor in the division operation and a partially extracted negative square root in the square root extraction operation;

a position register for holding processing bit information for connecting the partially extracted square root and quotient digits produced in the quotient producer in the square root extraction operation;

a divisor-partial square root selector for selecting one of the divisor, triple divisor, and one of the negative and positive partially extracted square root from the divisor-partial square root positive register and triple divisor-partial square root negative register on the basis of at least one of the quotient from the quotient producer and processing bit information from the position register;

a carry save adder for inputting the lower bits of the partial remainder in the redundant binary representation and an output of the divisor-partial square root selector to add input data;

a carry propagation adder for inputting the upper bits of the partial remainder in the two's complement representation, the output of the divisor-partial square root selector and a carry signal from the carry save adder to add input data;

and a two's complement conversion and shift device supplied with the output of the carry propagation adder and upper Carry Save Add (CSA) data, which is a first bit number of data bits from the upper bits of the carry save adder, the first bit number being determined on the basis of one of the higher radix in the division operation and the lower radix in the square root extraction operation, converting the upper CSA data into two's complement representation data, and shifting the output of the carry propagation adder and the two's complement representation data by a second bit number, the second bit number determined on the basis of one of the higher radix in the division operation and the lower radix in the square root extraction operation to obtain the upper bits of another partial remainder for a next step, wherein the two's complement conversion and shift device comprises:

a first two's complement converter supplied with a third bit number of data bits from the upper bits of carry save adder, the third bit number being determined on the basis of the higher radix, and converting the input data into the two's complement representation data;

a second two's complement converter supplied with a fourth bit number of data bits from the upper bits of carry save adder, the fourth bit number being determined on the basis of the lower radix, and converting the input data into the two's complement representation data;

a selector for selecting one of the first two's complement converter in the division operation and the second two's complement converter in the square root extraction operation;

and a shifter for shifting an output of the selector by a fifth bit number determined on the basis of the higher radix in the division operation and by a sixth bit number determined on the basis of the lower radix in the square root extraction operation to obtain another partial remainder for the next step.

2. A division and square root arithmetic unit for carrying out a division operation of a higher radix and a square root extraction operation of a lower radix, comprising:

a quotient producer for producing a quotient by referring to upper bits of a partial remainder; a partial remainder register for holding the upper bits of the partial remainder in a two's complement representation and lower bits of the partial remainder in a redundant binary representation except the upper bits of the partial remainder;

a divisor-partial square root positive register for holding one of a divisor in the division operation and a partially extracted positive square root in the square root extraction operation;

a triple divisor-partial square root negative register for holding one of a triple divisor in the division operation and a partially extracted negative square root in the square root extraction operation;

a position register for holding processing bit information for connecting the partially extracted square root and quotient digits produced in the quotient producer in the square root operation;

a divisor-partial square root selector for selecting one of the divisor, triple divisor, and one of the negative and positive partially extracted square root from the divisor-partial square root positive register and triple divisor-partial square root negative register on the basis of at least one of the quotient from the quotient producer and processing bit information from the position register;

a carry save adder for inputting the lower bits of the partial remainder in the redundant binary representation and an output of the divisor-partial square root selector to add input data;

a carry propagation adder for inputting the upper bits of the partial remainder in the two's complement representation, the output of the divisor-partial square root selector and a carry signal from the carry save adder to add input data;

and a two's complement conversion and shift device supplied with the output of the carry propagation adder and upper Carry Save Add (CSA) data, which is a first bit number of data bits from the upper bits of the carry save adder, the first bit number being determined on the basis of one of the higher radix in the division operation and the lower radix in the square root extraction operation, converting the upper CSA data into two's complement representation data, and shifting the output of the carry propagation adder and the two's complement representation data by a second bit number, the second bit number determined on the basis of the higher radix in the division operation and the lower radix in the square root extraction operation to obtain the upper bits of another partial remainder for a next step, wherein the two's complement conversion and shift device comprises:

a first shifter for shifting to the right in the square root operation the upper bits of the partial remainder in the two's complement representation by a third bit quantity, determined by a difference between radices of the division operation and the square root extraction operation, to send shifted data to the carry propagation adder;

a second shifter for shifting to the right in the square root operation the lower bits of the partial remainder in the redundant binary representation by a fourth bit quantity, determined by the difference between the radices of the division operation and the square root extraction operation, to send shifted data to the carry save adder;

a two's complement converter for inputting the result of the carry propagation adder and data extracted of a fifth bit quantity determined by the higher radix of the division operation from the upper bits of the result of the carry save adder, and converting the input data into the two's complement representation data;

and a third shifter for shifting to the left an output of the two's complement converter by a sixth bit number, determined on the basis of the higher radix of the division operation, to obtain another partial remainder for the next step.

* * * * *